United States Patent [19]
Agrawal et al.

[11] Patent Number: 6,072,809
[45] Date of Patent: Jun. 6, 2000

[54] STATISTICAL METHOD FOR DYNAMICALLY CONTROLLING THE PLAYBACK DELAY OF NETWORK MULTIMEDIA STREAMS

[75] Inventors: Prathima Agrawal; Balakrishnan Narendran, both of New Providence; Cormac Sreenan, Morris, all of N.J.

[73] Assignee: Lucent Technologies, Inc., Murray Hill, N.J.

[21] Appl. No.: 08/911,598

[22] Filed: Aug. 14, 1997

[51] Int. Cl.[7] .................................................. H04J 3/06
[52] U.S. Cl. ............................................ 370/503; 370/519
[58] Field of Search ..................................... 370/503, 512, 370/519, 241, 252; 375/354, 355, 356; 386/96, 98

[56] References Cited

U.S. PATENT DOCUMENTS 5,600,632  2/1997  Schulman .................................. 370/503
5,815,634  9/1998  Daum ......................................... 386/96

Primary Examiner—Ajit Patel
Assistant Examiner—Ricardo M Pizarro
Attorney, Agent, or Firm—Synnestvedt & Lechner LLP

[57] ABSTRACT

A method is disclosed for maintaining and updating statistical trends of network delay to provide a predictive approach to synchronization. Necessary information, such as timing and stream ID information, is gathered from streams of data and future network delay values are predicted by constructing a measured packet-delay distribution curve. In a preferred embodiment, the inventive system maintains a delay histogram with a discrete set of quantization bins, each storing the relative frequency with which a particular delay value is expected to occur among the arriving packets. The histogram is then used to approximate the distribution in the form of a curve.

27 Claims, 5 Drawing Sheets

STATISTICAL METHOD FOR DYNAMICALLY CONTROLLING THE PLAYBACK DELAY OF NETWORK MULTIMEDIA STREAMS

FIELD OF THE INVENTION

The present invention relates generally to the field of data communication networks, and more specifically to synchronization methods and apparatus for synchronizing the delivery of data packets received over such networks.

BACKGROUND OF THE INVENTION

The use of packet-based communication networks to transport digitized streams of audio, data and video is very common. The characteristics of these networks are such that the total delay experienced by each data packet is a function of variable delays due to physical media access, relay queuing, and choice of routes in addition to fixed propagation delays. The result is that the time difference between transmitting any two packets at the source is unlikely to be the same as that observed upon their arrival at the destination. The delay variations (known as jitter) are a particular problem for a stream of multimedia packets, because the jitter can have an impact on the audiovisual quality as perceived by a human user.

Synchronization methods are used at the receiver to handle delay variations. These synchronization methods usually operate by selectively choosing to drop certain packets deemed to be late or by adding further playback delays to certain packets at the receiver. The playback delay represents delay experienced at the playback location or at any output means. Thus, the total delay experienced by any packet represents the sum of network delay and playback delay.

The synchronization methods store and track the statistical trends of the delays occurring within the network. Since the network characteristics vary with time, these statistical trends vary, and current information is necessary for the methods to be effective.

There are various prior art approaches to storing the statistical trends to keep the information current. One approach is the "full aggregation" method wherein all of the data is accumulated into a single distribution curve throughout the lifetime of the transmission. The second approach is the "flush and refresh" approach in which statistical samples are stored for a period of time and then periodically flushed and refreshed.

With the first approach, the recent information and old information are given the same weight in terms of their influence on the distribution function estimate. Therefore, it is slow to react to changes occurring in the system. With the second approach, the periodic flush results in a complete loss of historic information and can introduce boundary effects at the flush instances. Neither approach is suitable for a wide range of applications which are sensitive to total end-to-end delay (TED), which need a method that can dynamically control the delay of network multimedia streams.

As a result there is a need for a dynamic statistical method which can predict the future TED by analyzing historical and current information and can monitor, maintain, update, and store dynamic statistical trends of network delays.

SUMMARY OF THE INVENTION

The present invention relates to methods for maintaining and updating statistical trends of network delay to provide a predictive approach to synchronization. According to the present invention, necessary information, such as timing and stream ID information, is gathered from streams of data and future network delay values are predicted by constructing a measured packet-delay distribution curve. In a preferred embodiment, the inventive system maintains a delay histogram with a discrete set of quantization bins, each storing the relative frequency with which a particular delay value is expected to occur among the arriving packets. The histogram is then used to approximate the distribution in the form of a curve.

An aging function is essential to allow the predictive approach of the current invention. In prior art systems, the older samples are completely flushed from the system, i.e., valuable historical information is discarded from the system. With the present invention, older samples are aged gradually to keep the threshold values dynamic. Instead of discarding the information, the information is "gradually retired" so that some historical information is kept and used to make necessary recommendations about future TED values.

A data stream synchronization system in accordance with one aspect of the present invention includes a packet processing unit connected to a system control unit. The system control unit is also connected to two memory arrays, one for storing initialization parameters and the other for storage of arrays of stream delay data. The initialization parameters include necessary information to initialize various memory arrays, packet-delay distribution data, and aging parameters.

The system control unit is operatively connected to a timing unit and a playout control unit. The packet processing unit receives the incoming packets, extracts necessary stream and timing (overhead) information, distributes the stream and timing information to the system control unit, and passes the actual data to the playout buffers to be passed on to the device output means for presentation. The system control unit receives input from the playout control unit for adding/dropping a particular stream for processing and determining the threshold values and querying the system.

Other features and advantages of the present invention will become readily apparent to those of ordinary skill in the art by reference to the following detailed description and accompanying drawings.

BRIEF DESCRIPTION OF THE DRAWINGS

A better understanding of the invention may be obtained from consideration of the following detailed description taken in conjunction with the accompanying drawings in which.

DETAILED DESCRIPTION OF THE INVENTION

To best understand the present invention it is important to be familiar with the environment in which it is used. A data stream is defined as a sequence of packets. Each packet comprises two basic components: the data component, which is the "actual" data being transmitted for use by the recipient, and the "overhead" component, which includes identifying information about the packet. For example, each packet is marked with a stream ID and a sequence number as well as timing information. This kind of identifying information is part of the overhead component of the packet.

A data stream is characterized by its TED, and the percent packet lateness (PPL) it can tolerate. PPL represents the percentage of packets deemed late, and TED represents the sum of the network delay and the playback delay of the data stream. For each data stream a packet delay distribution (PDD) curve is constructed. The PDD curve is a graphical representation of the delays suffered by packets in the network. The PDD is expressed as the percentage of packets expected to experience a particular delay measured from transmission from the source to receipt by the receiver. A typical network PDD curve and description thereof is disclosed in U.S. Pat. No. 5,623,483 to Agrawal et al.

Data stream delays must be controlled so that a user at the receiving end receives intelligible information. The present invention maintains and updates the statistical trends of the network delays and dynamically updates the PDD curve.

Figure 1:
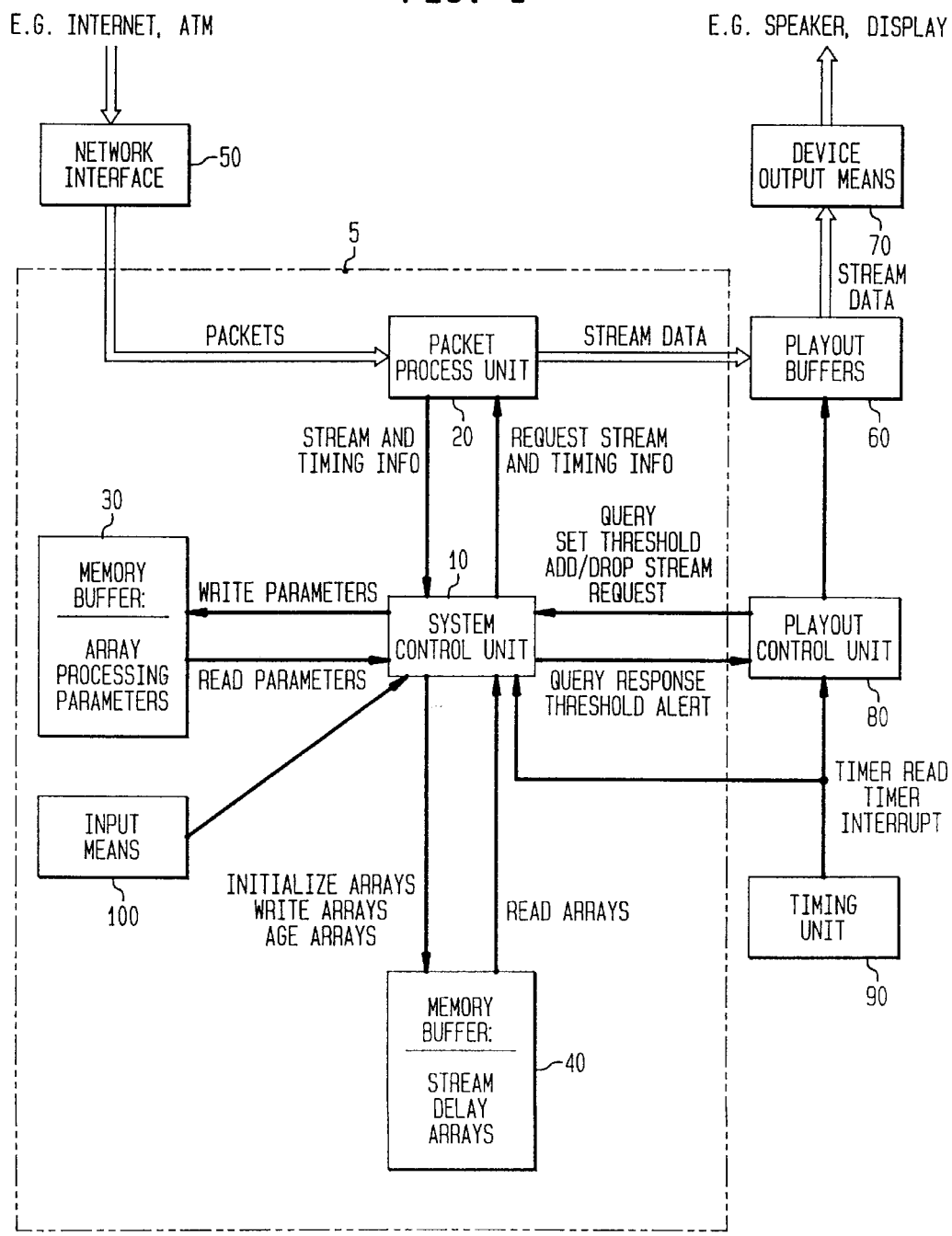
FIG. 1 is a functional block diagram of a delay control system in accordance with one aspect of the present invention.

Referring now to FIG. 1, a system 5 in accordance with one aspect of the present invention is shown in block diagram format. The system 5 may be used with any local or wide area network, such as the Internet. The system 5 can comprise a computer programmed to execute and control the functions described in more detail below. The system 5 includes a system control unit 10 operatively connected to a packet processing unit 20. The packet processing unit 20 has an input connected to a network interface 50 and an output connected to playout buffers 60. The packet processing unit 20 receives stream data from network interface 50 and reads associated stream ID and timing information from the packets within the stream. This stream ID and timing information is communicated to system control unit 10 while the stream data is passed on to playout buffers 60. The playout buffers 60 are directly linked to a device output means 70 which outputs the data to the receiver. Thus, the playout buffers 60 receive a stream of data from packet processor unit 20 and transmit the data to the device output means 70. Examples of device output means include speakers, display screens and the like.

The communication link between packet processor unit 20 and system control unit 10 is a dual bus. In a preferred embodiment, depending upon the application or use, the system control unit 10 may receive stream and timing information for every incoming packet. In another embodiment, the system control unit 10 may request the stream and timing information from packet processor unit 20 in response to a signal indicating the arrival of a particular packet (e.g., system control unit 10 may only request the stream and timing information from a particular stream and disregard the rest). The timing information includes network delay information associated with incoming data packets.

The system control unit 10 is also connected to memory buffer 30 and memory buffer 40. The present invention maintains a delay histogram using a discrete set of quantization bins, each storing the relative frequency with which a particular delay value is observed among the arriving packets. The memory buffer 30 stores various initialization parameters including initial histogram values, histogram units and bin widths, aging frequency, and initial threshold values for TED and PPL. The histogram is then used to prepare the PDD curve. The variations of the statistical trends with time are captured by gradually aging the older samples in the histogram so that the most recent values have the most influence. The aging gradually diminishes the effects of older samples and replaces them with recent ones. The age of a sample can be accurately recorded by maintaining the arrival-time information of each packets. For efficiency, the information related to the packets that is entered into the histogram does not include the packet arrival-time information; this arrival-time information may be stored elsewhere in the system in a well known manner.

The system control unit 10 can read and write initialization parameters to memory buffer 30. The memory buffer 40 stores arrays of stream delay data and may include a stream counter which keeps a current count of the number of data streams being processed by system 5. A stream delay array stores valuable data to be used by a histogram (e.g., the frequency of occurrence of a particular packet delay value). The system control unit 10 updates memory buffer 40 dynamically and can initialize, write, and age stream delay array values in memory buffer 40. The system control unit 10 also can read the stream delay array values from memory buffer 40.

A playout control unit 80 controls the output of the playout buffer 60. The playout control unit 80 and playout buffer 60 are initialized by the user and/or by an application. The system relies on the user or application to provide initialization parameters which carry important information e.g. desired value of PPL, stream identification information, initial histogram values, initial threshold values, aging parameters, etc.

The system control unit 10 is operatively connected to the playout control unit 80 by a dual bus and transmits and receives information from the playout control unit 80. The playout control unit 80 may transmit requests to system control unit 10, including requests to add/drop a stream from processing, set PPL and TED thresholds, or send a query message as explained below. The system control unit 10 may transmit responses to query requests from playout control unit 80 as well as provide any threshold alerts. These threshold alerts include interrupt messages or alarms indicating that certain thresholds are exceeded.

The playout control unit 80 is also connected to a timing unit 90, which is simply a clocking device. The timing unit 90 can send timing interrupt or timing alarm signals to system control unit 10 and is used to control any functions which are repeated on a regular basis. One example of such repetitive functions is aging based on time. The timing unit 90 can also send signals directly to playout controller 80.

The system 5 is flexible and adaptable to user or application-provided parameters. The system control unit 10 has a direct input link to an input means 100. The input means 100 may be a user link (e.g., the user's computer) or an application link (e.g., a computer program) which provides system parameters to system control unit 10. The system control unit 10 may receive input parameters from input means 100 and configure and initialize the memory buffer 30 according to those parameters. The initialization parameters are usually determined by the program or the application that is using system 5. For example, the invention may be used to synchronize audio signals or to remove jitter between audio and video signals. The initialization parameters in both these applications will be different as system requirements are different. These parameters may include memory buffer size, array size, maximum and minimum value of the histogram, and initial histogram default values specified for each stream.

The initialization parameters also determine the histogram bin widths and the aging coefficient. A bin-width represents the range of the delay value stored in the particular bin. The bin-width is directly related to the accuracy of data stored. Narrow bins carry higher accuracy than wider bins. For example, a bin-width representing a 0–2 second delay will provide more accuracy than a bin width representing a 0–10 second delay. However, the number of bins required increases directly as the width of the bins is narrowed. The aging coefficient determines the rate at which older samples are gradually aged.

The initial PPL (e.g. 1%), and initial TED (e.g. 100 milliseconds) are specified for each stream. In a multi-stream environment, the PPL and TED may be specified for all streams or on a per-stream basis.

The PDD is initialized using delay information provided by the network administrator, the user, the transmission source, or specified as an initial approximation. Thereafter, the system control unit 10 updates the PDD model based upon actual packet delays experienced during buffer operation to reflect changing network operating characteristics.

As the TED value decreases, an increasingly greater percentage of packets will experience delay greater than or equal to the TED value. Since the packets experiencing a delay greater than the TED value are considered late, the PPL will increase as the TED value decreases. Thus, it is important to choose the appropriate initial TED value based upon an acceptable PPL for the particular application or user requirement.

Figure 2:
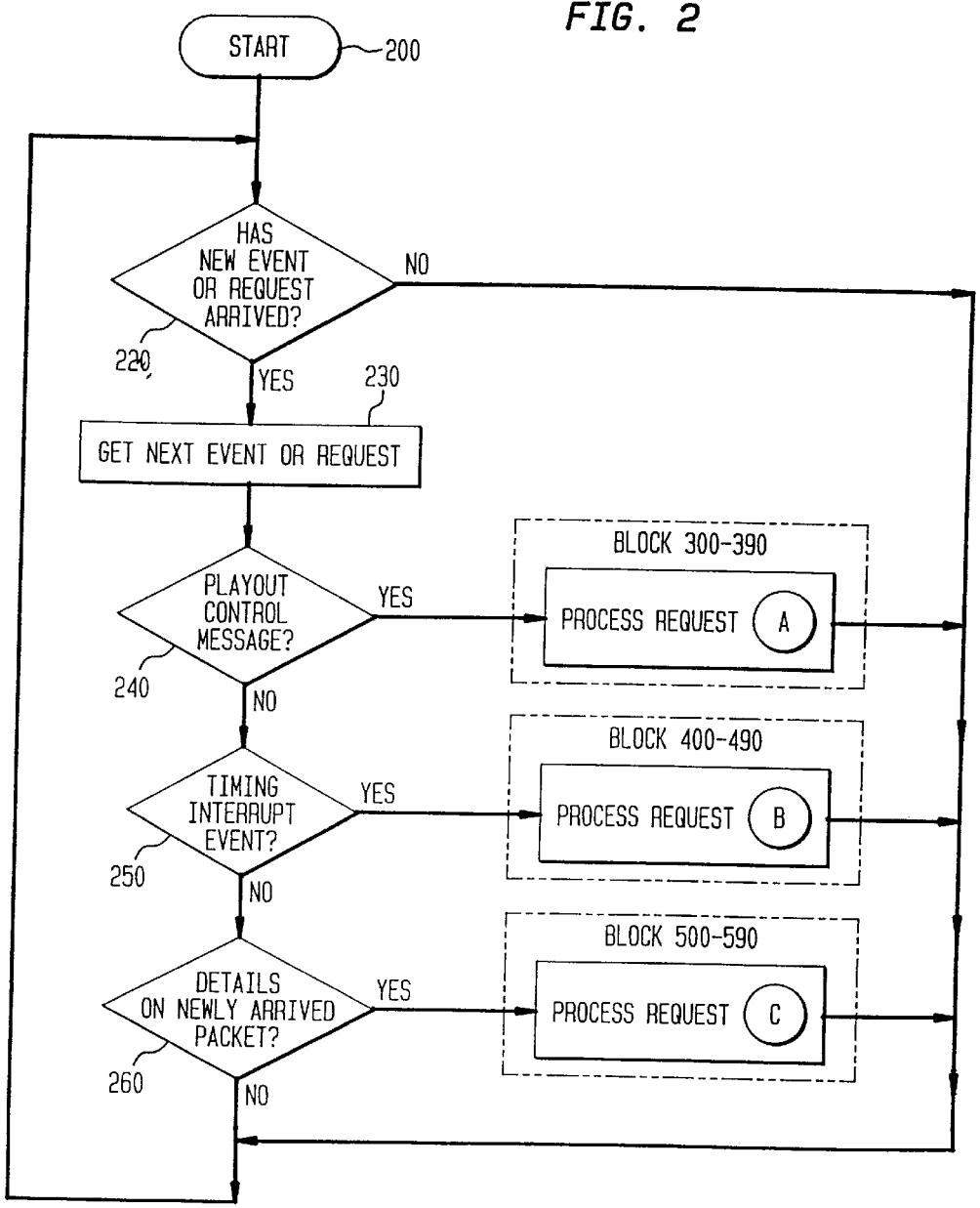
FIG. 2 illustrates the steps involved in handling a new event or request.

The system control unit 10 calculates the TED value and constructs the PDD curve for each stream of data. FIG. 2 illustrates the steps taken by system control unit 10 in handling an incoming data stream. The system control unit 10 waits for a new event or request indicating that there are incoming streams of data packets which need to be processed by the system 5 (block 220). The system control unit 10 records in memory buffer 40 the number of streams being handled in the system. Thus, when an incoming stream arrives for processing, the stream counter of memory buffer 40 is incremented to reflect the receipt of the new stream.

When a new event or request is received, the system control unit 10 retrieves the new event or request which requires processing (block 230). The system control unit 10 then determines if the new event or request is a playout control message from playout controller 80 (block 240). The playout control messages include requests for adding a stream to be processed by system 5 or for dropping a stream from the processing of system 5. If the new event is a playout control message (block 240), the request is processed and the stream counter is updated (see blocks 300–390). After processing the playout control message, the system returns to block 220 and awaits another new event or request.

If the new event is not a playout control message, the system control unit 10 determines if the incoming event or request is a timing interrupt event coming from timing unit 90 (block 250). A timing interrupt event may be, for example, a periodic timing signal indicating that a required aging needs to be performed. If the incoming request or event is a timing interrupt event, the timing interrupt event is processed (see blocks 400–490). After processing the request, the system returns to block 220 and waits for another new event or request.

If the new event or request is not a timing interrupt event, the system control unit 10 determines if the new event or request is a packet event from packet processing unit 20 carrying details about a newly arrived packet (block 260). If the new event represents information about a new packet, the stream and timing information associated with the newly arrived packet is determined (see blocks 500–590). After processing the request, the process returns to block 220 and waits another new event or request.

However, if the new event or request is not a packet event, the process returns to block 220 and the system control unit 10 checks for any newly arrived requests or events. The iteration of blocks 200–260 continues until all of the new requests or events are processed. The process pauses in a wait mode if there are no new requests or events.

Figure 3:
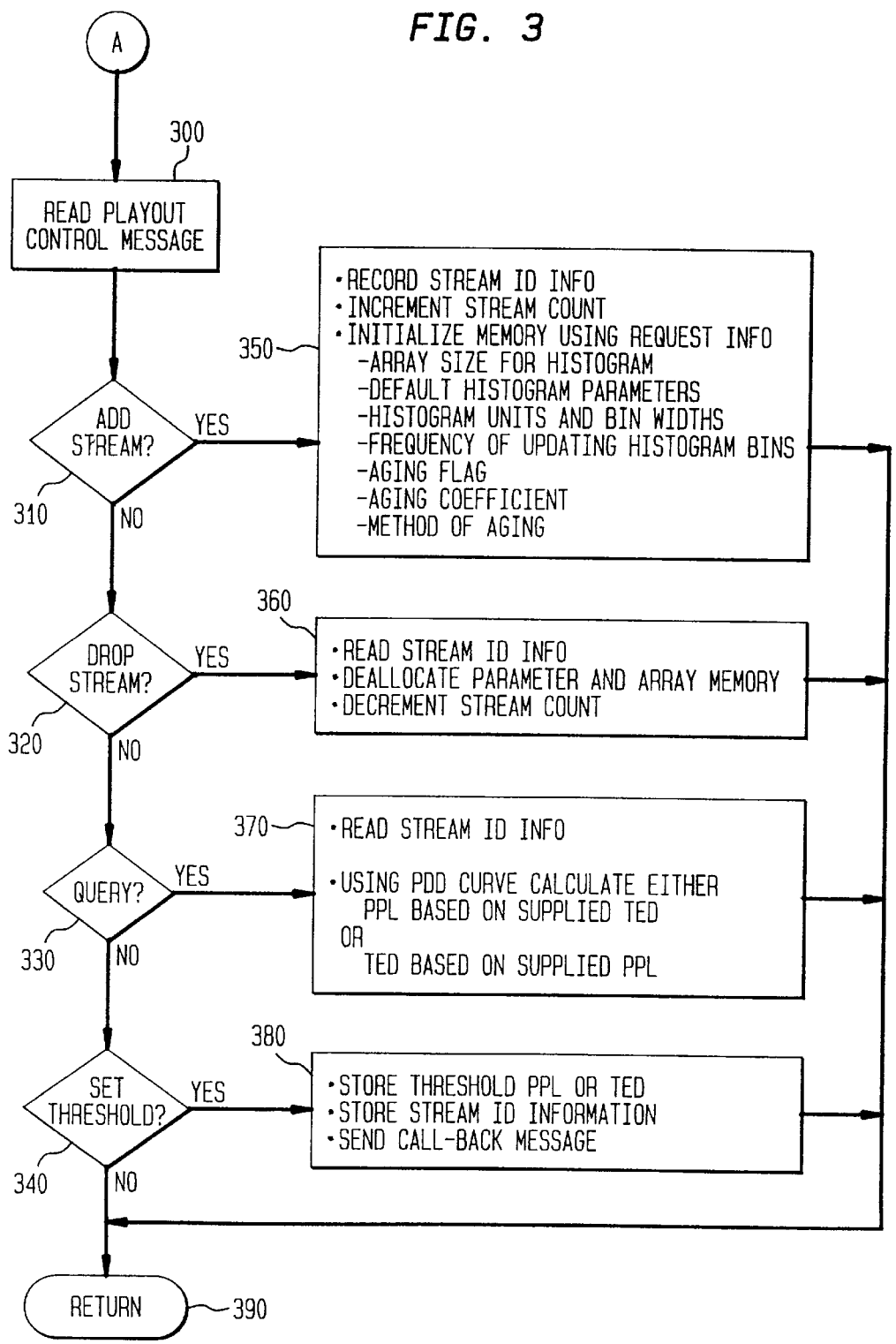
FIG. 3 illustrates the steps involved in processing control messages.

FIG. 3 describes in detail the steps involved in handling playout control messages from playout control unit 80. The process begins with the receipt and reading of the playout control message (block 300). Next, the new request is classified into a predetermined class e.g., adding a stream, dropping a stream, querying TED or PPL, or setting a threshold for TED and PPL.

The decision function in block 310 determines if the incoming message is a request to add a new stream. If the incoming message is a request for the addition of a new stream, the system records the stream ID, increments the stream counter of memory buffer 40, and initializes the stream delay arrays using the information provided by the incoming request (block 350). The system records the stream ID so that the data stored can be correlated to the correct data stream. The system control unit 10 initializes several parameters for the new data stream. System control unit 10 sets the array size for the histogram, the number of histogram units, and the histogram bin widths. The histogram bins store frequency of delay patterns. This initialization step enables users or applications/programs to select the correct balance of bin-width and accuracy. The system control unit 10 also initializes other histogram parameters to default values. These default values are predetermined by users or user applications. The system control unit 10 calculates frequency parameters by determining how often the histogram bins should be updated. It may be impractical to update histogram parameters for every packet, so the system permits users or applications to determine how often the bins should be updated.

The system control unit 10 also initializes an aging flag indicating whether aging is on or off. If aging is on, the aging coefficient, supplied by a user or an application, determines how often the packets should be aged. If the aging is more frequent, the data stored is very current and quick to react to changes, but the data stored may lose historical information, which may be essential for future predictions, too quickly. If the aging is less frequent, important historical information is stored for a longer time, but the data may not be current enough and may not react quickly to changes. Based on input received from playout control unit 80, the system control unit 10 also selects a method of aging.

The aging may be achieved in several ways. A simplistic approach involves discarding all the data exceeding a predetermined threshold. This threshold value may be based upon a certain number of packets received or the passage on a predetermined time period. While this approach retains more history information than the conventional "flush and refresh" method, it is hard to implement since deciding which data to discard requires maintaining the data in a sequence form, rather than in the preferred accumulated statistical form.

A preferred approach to aging involves not discarding the older data entirely, but instead gradually reducing its effect on the statistical distribution. This is done by periodically scaling down the existing distribution histogram by an aging coefficient determined by a user or an application while continuing to add new sample data with a constant weight. This periodic method may be based upon the certain number of packets received or on the passage of a certain time period. This method progressively lessens the influence of older sample points while giving the newer ones a larger effect.

After the statistical trends of the network are measured and the future TED values are predicted, this information is used to adjust the playback delay (either dropping packets or adding delay) at the receiver.

After accepting the various initialization and other parameters from a user or an application and, allocating stream delay arrays, the process returns to its original mode (block 390).

If a determination is made that the incoming message is not a request for the addition of a new data stream (block 310), then it is determined if the incoming message is a request for the dropping of a data stream (block 320). If the incoming message is a request for the dropping of a data stream, the system control unit 10 reads the stream ID information, deallocates associated stream delay arrays, and decrements the stream counter. After deallocating stream delay arrays and decrementing the stream counter, the process returns to its original mode (block 390).

If the incoming message is not a request for the dropping of a data stream, the next step is to determine if the incoming request is a query signal (block 330). The query signal involves the sending of a polling signal to control unit 10 and waiting for an answer. Two example of polling signals are requests seeking information on the PPL or requests seeking information on the TED. If the incoming request is one of these types of query signals, the process, depending upon the type of query signal, may calculate PPL based upon a supplied TED value, or calculate a TED value based upon the supplied value of PPL. Both of these operations are accomplished by the use of an already constructed PDD curve. After calculating the necessary information and transmitting the information back to the query source, the process returns to its original mode (block 390).

If the incoming request is not a polling or query request, the next step is to determine if the incoming request is a request for the setting of new thresholds (block 340). A typical request of this type includes a request to set new threshold values for PPL or TED. These threshold values are set so that the system can send out an alert or an alarm message when the threshold values are exceeded. If the incoming request is a request to set new thresholds, new threshold values for PPL or TED are stored (block 380). The stream identification information to which the new threshold values correspond is also stored. After storing the new threshold values, a call-back message is sent to a user or an application indicating that the changes in the threshold value have been made. The process then returns to its original mode (block 390).

If the playout control message is not for adding/dropping a stream or polling or setting a threshold, the process returns to its original mode, since a request must be classified into one of the predetermined classes of adding a stream, dropping a stream, querying, or setting a threshold.

Figure 4:
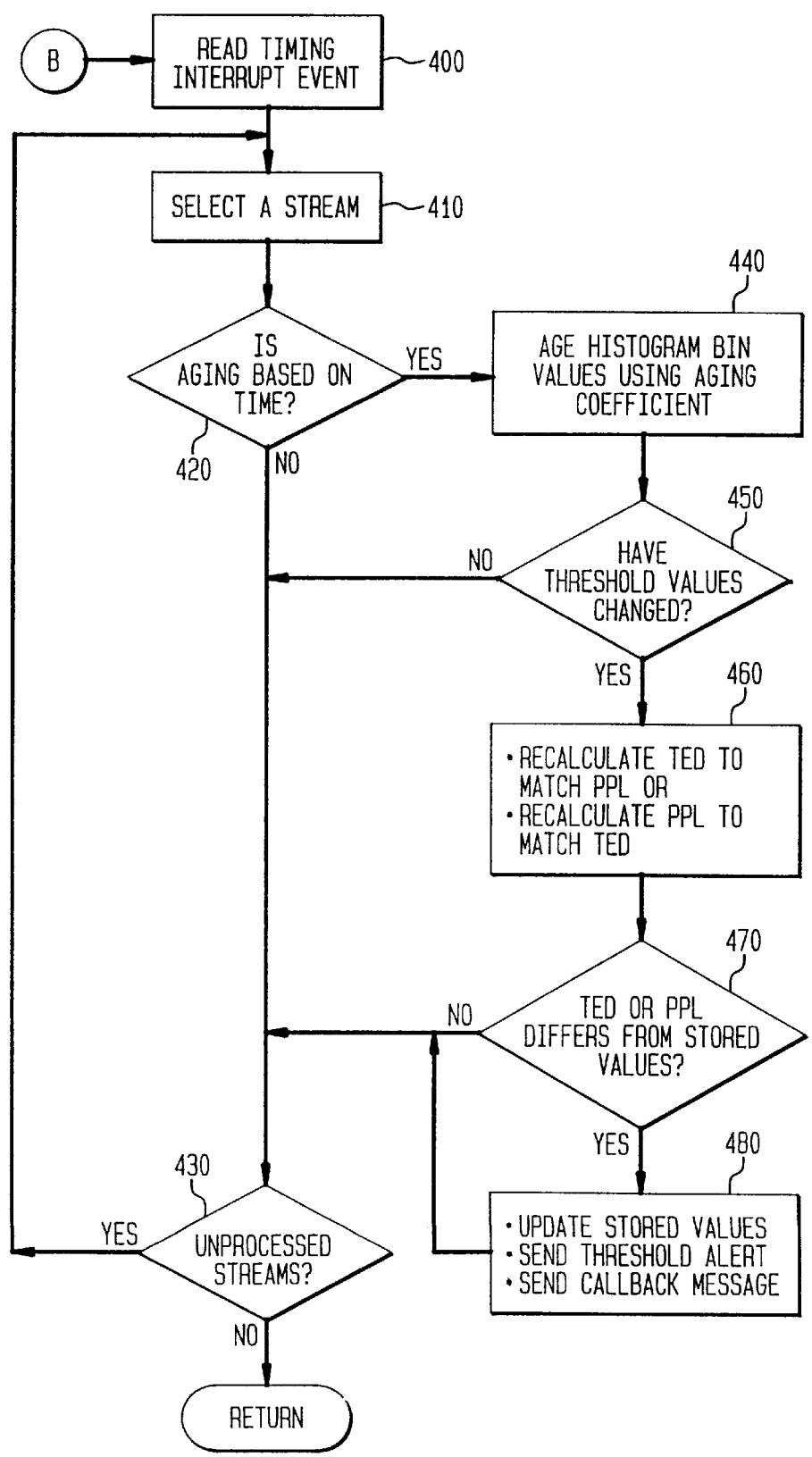
FIG. 4 illustrates the steps involved in processing timer interrupt events.

FIG. 4 depicts the basic steps involved in handling timing interrupt event requests. The process starts with the reading of a timing interrupt event (block 400). The next step is to select a data stream (block 410) since there may be more than one data stream to which a timing interrupt event applies. The process selects each data stream, one at a time, and then processes associated timing interrupt events.

The next step is to determine if the timing interrupt event involves aging based on time (block 420). If the timing interrupt event does not involve aging based on time, the process returns to the beginning to select another data stream. If the timing interrupt event does involve aging based on time, the process retrieves previously stored aging coefficient values and ages and updates histogram bins using these aging coefficients (block 440). After updating the histogram, it is determined if the threshold values of TED or PPL have changed and require updating (block 450). If no changes are required, the process jumps to block 430 to check for any other unprocessed data streams.

If the threshold values have changed, the TED values are recalculated to achieve the new threshold PPL values or the PPL values are recalculated to match the new threshold TED values (block 460). If the newly calculated threshold TED or threshold PPL values differ from the stored threshold values (block 470), the system control unit 10 updates and stores values to reflect the changes and sends a threshold alert to playout control unit 80 indicating changes in threshold values (block 480). The threshold alert may, for example, send a call-back message to a user or an application indicating changes in the threshold values.

If the threshold values do not need updating, an evaluation is made by the system control unit 10 to see if there are any other unprocessed data streams (block 430). If there are no other data streams left unprocessed, the process ends. Otherwise, the process iterates back to block 410 to select another data stream and repeats the steps of block 410–480.

Figure 5:
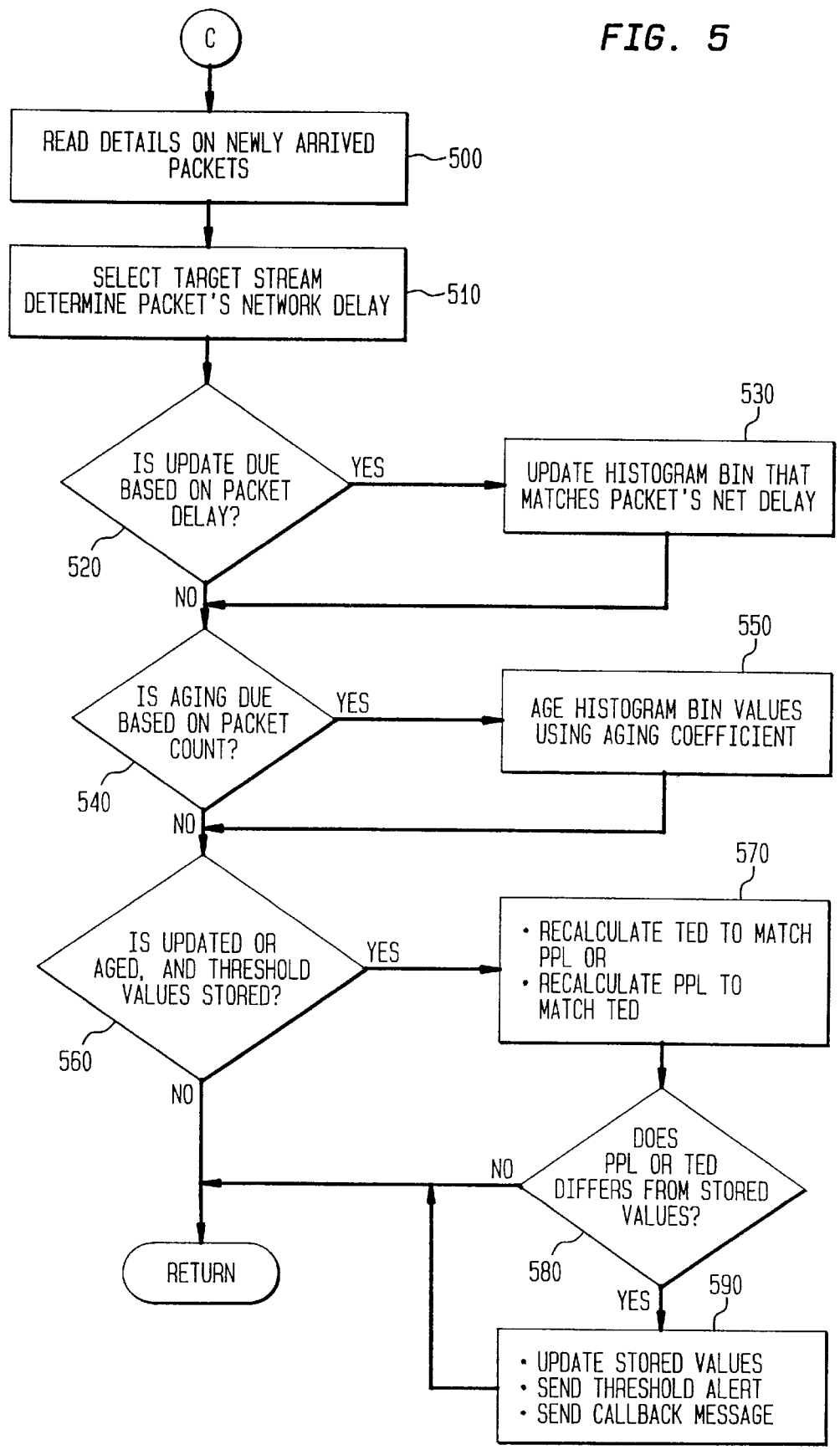
FIG. 5 illustrates the steps involved in processing stream and timing details associated with newly arrived packets.

To determine the stream ID and timing properties associated with newly-arrived packets, the system control unit follows the steps as depicted in FIG. 5. First, the newly-arrived packets are read (block 500). Next, a target data stream is selected and the associated stream ID, timing, and delay information is determined (block 510). Then it is determined if a histogram update is required based on the delay associated with packets received (block 520). If a histogram update is required, system control unit 10 updates the histogram bin that matches the packet's net delay (block 530). If, based on the packet delay, a histogram update is not required (e.g., the packet delay value does not exceed a required threshold), the system control unit 10 determines if aging is required based on the count of packets received (block 540).

The aging method based on packet count involves gradually retiring older samples after receipt of a predetermined number of new data packets. For example, aging may occur at every data packet arrival. In this case, the histogram does not contain integers representing packet counts in each delay bin. Rather, the delay histogram is normalized by introducing scaled real numbers so that the sum of all the quantization bins add up to 1.0. At each packet arrival, each of the bin's values is scaled down by a scaling factor (e.g. 0.99) and the bin corresponding to the new arrival's delay is incremented (e.g. by 0.01), so that the resultant sum remains at 1.0.

In another example, a user or an application may choose to age the statistical data every 1000 packets and increment the histogram bin corresponding to each packet's delay by one whenever a packet arrives. In this case, at the arrival of every 1000 packets, each of the bins are multiplied by an aging parameter based on the aging coefficient (e.g., 0.999), and the total count is readjusted by the aging parameter times the previous sum of all the histogram bin contents. Thus, the newly arriving packets continue to increase the count of their corresponding bins and keep the statistical data current.

If aging based on number of packets is required, the system control unit 10, ages the histogram bin values using the aging coefficient (block 550). For example, the current bin values are multiplied by the aging coefficient.

After processing an update (block 530) or an aging function (block 550), it is determined whether an update of the threshold PPL and TED values is required. In block 560, a comparison is made between the incoming threshold values and the previously stored threshold values. If the threshold values have changed, the TED value is recalculated based upon the new threshold PPL or the PPL is recalculated to match the new threshold TED value (block 570). In other words, a user or an application provides the acceptable PPL value and then the TED value that must be used to achieve the PPL value is calculated. Or, a user or an application provides the acceptable TED value, and a PPL to achieve this TED value is calculated.

After calculating the TED or PPL value, the calculated TED or PPL values are compared to their respective stored threshold values (block 580). If an update is required based on a change in threshold values, the stored threshold values are updated accordingly. The system control unit 10 also sends a callback message to a user or an application informing the user of the application of the change in threshold values (block 590). The process then returns to its beginning, marking the end of an iteration.

If an update or aging is not required, the system returns to the beginning to process another iteration (block 500).

From the foregoing description, it will be apparent that the present invention provides improvements in network data stream synchronization systems and methods to satisfy the need for a predictive approach. Among other things, the present invention is an improvement over the prior art in that it looks not only at current data, but stores historical information to predict future TED values, and weights the current data more heavily than the historical data.

It should be appreciated that variations and modifications of the herein described system and methods, within the scope of the invention will be apparent to those skilled in the art. Accordingly, the foregoing description should be taken as illustrative and not in a limiting sense.

We claim:

1. A delay management system to dynamically manage playback delay for data streams within a network, said network communicating data streams between a plurality of endpoints, each of said data streams comprising a plurality of data packets and having a threshold for acceptable percent packet lateness (PPL), each of said data packets including a stream ID and timing information, said delay management system comprising:

receiving means for receiving new data packets from said data streams;

packet processing means for extracting said stream ID and said timing information associated with said data packets;

first storage means for storing said stream ID and said timing information associated with said data packets;

system control means for determining total end-to-end delay (TED) values based on said timing information and said PPL threshold; and output means for outputting said data packets and said TED values to the network.

2. The system of claim 1, wherein said system control means further comprises:

calculating means for calculating aging parameters;

aging means for aging said stored timing information according to said aging parameters and replacing said stored timing information with the aged timing information and said timing information from said new data packets; and updating means for updating said TED values after said stored timing information is replaced.

3. The system of claim 2, wherein said calculating means calculates said aging parameters based on retiring said stored timing information after a predetermined period of time.

4. The system of claim 2, wherein said calculating means calculates said aging parameters based on retiring said stored timing information after a predetermined number of said data packets have been received by said receiving means.

5. The system of claim 1, wherein said delay management system further comprises second storage means for storing said PPL and said TED values.

6. The system of claim 5, wherein said first storage means and said second storage means each comprise a plurality of memory arrays.

7. The system of claim 1, wherein said first storage means includes means for storing said timing information in a histogram.

8. The system of claim 7, wherein said system control means comprises histogram updating means for updating said histogram after said timing information is replaced with new timing information.

9. The system of claim 1, wherein said first storage means includes a stream counter, said stream counter storing statistical information related to the number of data streams being managed by said delay management system.

10. The system of claim 1, wherein said system control means further comprises receiving means for receiving initialization parameters and histogram processing parameters from said network, said initialization parameters and said histogram processing parameters being stored in said second storage means.

11. The system of claim 1, wherein said system control means further comprises:

receiving means for receiving threshold TED values from said network;

input means for inputting said threshold TED values to said first storage means; and processing means for generating threshold alert messages to the network when said threshold TED values are exceeded.

12. The system of claim 1, wherein said system control means further comprises:

receiving means for receiving threshold PPL values from said network;

input means for inputting said threshold PPL values to said first storage means; and processing means for generating threshold alert messages to the network when said threshold PPL values are exceeded.

13. The system of claim 1, said delay management system further comprising:

processing means for processing timing information from only selected data streams;

receiving means for receiving input from said network to process said selected data streams; and updating means for updating the timing information for the data packets of said selected streams.

14. The system of claim 1, wherein said delay management system further comprises means for receiving acceptable TED values from said network and calculating associated percent packet lateness (PPL) based on said TED values and timing information stored in said storage means.

15. A delay management method to dynamically manage playback delay for data streams within a network, said network communicating data streams between a plurality of endpoints, each of said data streams comprising a plurality of data packets and having a threshold for acceptable percent packet lateness (PPL), each of said data packets including a stream ID and timing information, said delay management system comprising:

receiving new data packets from said data streams;

extracting said stream ID and said timing information associated with said data packets;

storing said stream ID and said timing information associated with said data packets;

determining total end-to-end delay (TED) values based on said timing information and said PPL threshold; and outputting said data packets and said TED values to the network.

16. The method of claim 15, further comprising the steps of:

calculating aging parameters;

aging said stored timing information according to said aging parameters and replacing said stored timing information with the aged timing information and said timing information from said new data packets; and updating said TED values after said stored timing information is replaced.

17. The method of claim 16, wherein said step of calculating aging parameters is based on retiring said stored timing information after a predetermined period of time.

18. The method of claim 16, wherein said step of calculating aging parameters is based on retiring said stored timing information after a predetermined number of said data packets have been received during said step of receiving new data packets.

19. The method of claim 15, further comprising the step of storing said PPL and said TED values.

20. The method of claim 15, wherein said stored timing information is stored in a histogram.

21. The method of claim 20, further comprising the step of updating said histogram after said timing information is replaced with new timing information.

22. The method of claim 15, further comprising the step of storing statistical information related to the number of data streams being managed by said delay management system in a stream counter.

23. The method of claim 15, further comprising the steps of:

receiving initialization parameters and histogram processing parameters from said network; and storing said initialization parameters and said histogram processing parameters.

24. The method of claim 15, further comprising the steps of:

receiving threshold TED values from said network;

storing said threshold TED values; and generating threshold alert messages to the network when said threshold TED values are exceeded.

25. The method of claim 15, further comprising the steps of:

receiving threshold PPL values from said network;

storing said threshold PPL values; and generating threshold alert messages to the network when said threshold PPL values are exceeded.

26. The method of claim 15, further comprising the steps of:

processing timing information from selected data streams;

receiving input from said network to process said selected data streams; and updating the timing information for the data packets of said selected streams.

27. The method of claim 15, further comprising the steps of receiving acceptable TED values from said network and calculating associated percent packet lateness (PPL) based on said TED values and said stored timing information.

* * * * *